US007613622B2

(12) United States Patent
Jindel

(10) Patent No.: US 7,613,622 B2
(45) Date of Patent: Nov. 3, 2009

(54) SYSTEM AND METHOD FOR UNBUNDLING BAGGAGE COSTS FROM AIRFARE PRICES

(76) Inventor: Satish Jindel, 2200 Georgetowne Dr., suite 202, Sewickley, PA (US) 15143

( * ) Notice: Subject to any disclaimer, the term of this patent is extended or adjusted under 35 U.S.C. 154(b) by 913 days.

(21) Appl. No.: 10/963,110

(22) Filed: Oct. 12, 2004

(65) Prior Publication Data

US 2005/0251430 A1 Nov. 10, 2005

Related U.S. Application Data

(60) Provisional application No. 60/569,403, filed on May 7, 2004.

(51) Int. Cl.
*G06Q 10/00* (2006.01)
*G01C 21/34* (2006.01)
*G06F 7/00* (2006.01)

(52) U.S. Cl. ............... 705/5; 705/1; 705/6; 700/226

(58) Field of Classification Search .............. 705/1, 705/5–6; 700/226
See application file for complete search history.

(56) References Cited

U.S. PATENT DOCUMENTS

| | | | | |
|---|---|---|---|---|
| 4,800,502 | A * | 1/1989 | Stewart et al. | 705/417 |
| 5,793,639 | A | 8/1998 | Yamazaki | |
| 5,866,888 | A | 2/1999 | Bravman et al. | |
| 6,476,718 | B1 * | 11/2002 | Cartwright et al. | 340/572.1 |
| 6,512,964 | B1 * | 1/2003 | Quackenbush et al. | 700/226 |
| 6,594,547 | B2 | 7/2003 | Manabe et al. | |
| 6,711,463 | B2 | 3/2004 | Tozuka et al. | |
| 2003/0061085 | A1 * | 3/2003 | Lanigan, Sr. | 705/8 |
| 2003/0100973 | A1 | 5/2003 | Quackenbush et al. | |
| 2003/0120510 | A1 * | 6/2003 | Panek | 705/1 |
| 2003/0141411 | A1 * | 7/2003 | Pandya et al. | 244/114 R |
| 2003/0154087 | A1 | 8/2003 | Lewenstein | |
| 2004/0102979 | A1 * | 5/2004 | Robertson et al. | 705/1 |
| 2004/0199403 | A1 * | 10/2004 | Ananda | 705/1 |
| 2005/0044000 | A1 * | 2/2005 | Narayanaswami | 705/26 |
| 2005/0083171 | A1 * | 4/2005 | Hamilton | 340/5.7 |
| 2005/0086089 | A1 * | 4/2005 | Quackenbush et al. | 705/5 |

FOREIGN PATENT DOCUMENTS

WO WO 03065166 A2 * 8/2003

OTHER PUBLICATIONS

"Reduced Airline Fares Expected: Universal Express-USXP CEO Richard Altomare Recommends Nationwide Luggage Movement System Based On Parcel Carrier Model", Oct. 23, 2003, Business Wire.*
"Airport Address Terminal Congestion With Remote Check-In", Aug. 24, 2001, World Airline News. V. 11, N. 34.*
Rivera, Dylan "Air Travelers Should Pack Light, Bring Lunch For Smoother Holiday Trip", Nov. 21, 2003, KRTBN Knight-Ridder Tribune Business News—The Oregonian, Portland.*
O'Malley, Chris, "Airport Store In Indianapolis May Ease Flier's Fear Of Film Flops", Aug. 12, 2003, KRTBN Knight-Ridder Tribune Business News—The Indianapolis Star.*
Pandya, International PCT Publication WO 03/065166, Aug. 7, 2003.

* cited by examiner

*Primary Examiner*—John W Hayes
*Assistant Examiner*—Fadey S Jabr
(74) *Attorney, Agent, or Firm*—McKay & Associates, P.C.

(57) ABSTRACT

A system and method is provided for categorizing airline passengers traveling with and without baggage and unbundling the baggage costs associated with the airfare to encourage separate parcel service use. In one embodiment, based on information from an online booking system, the traveler is allowed to choose from a variety of options addressing modes of baggage handling, and an online routine determines the associated costs for the options chosen, providing travel rates that vary from the typical base airfare.

15 Claims, 8 Drawing Sheets

Fig. 1 – Prior Art

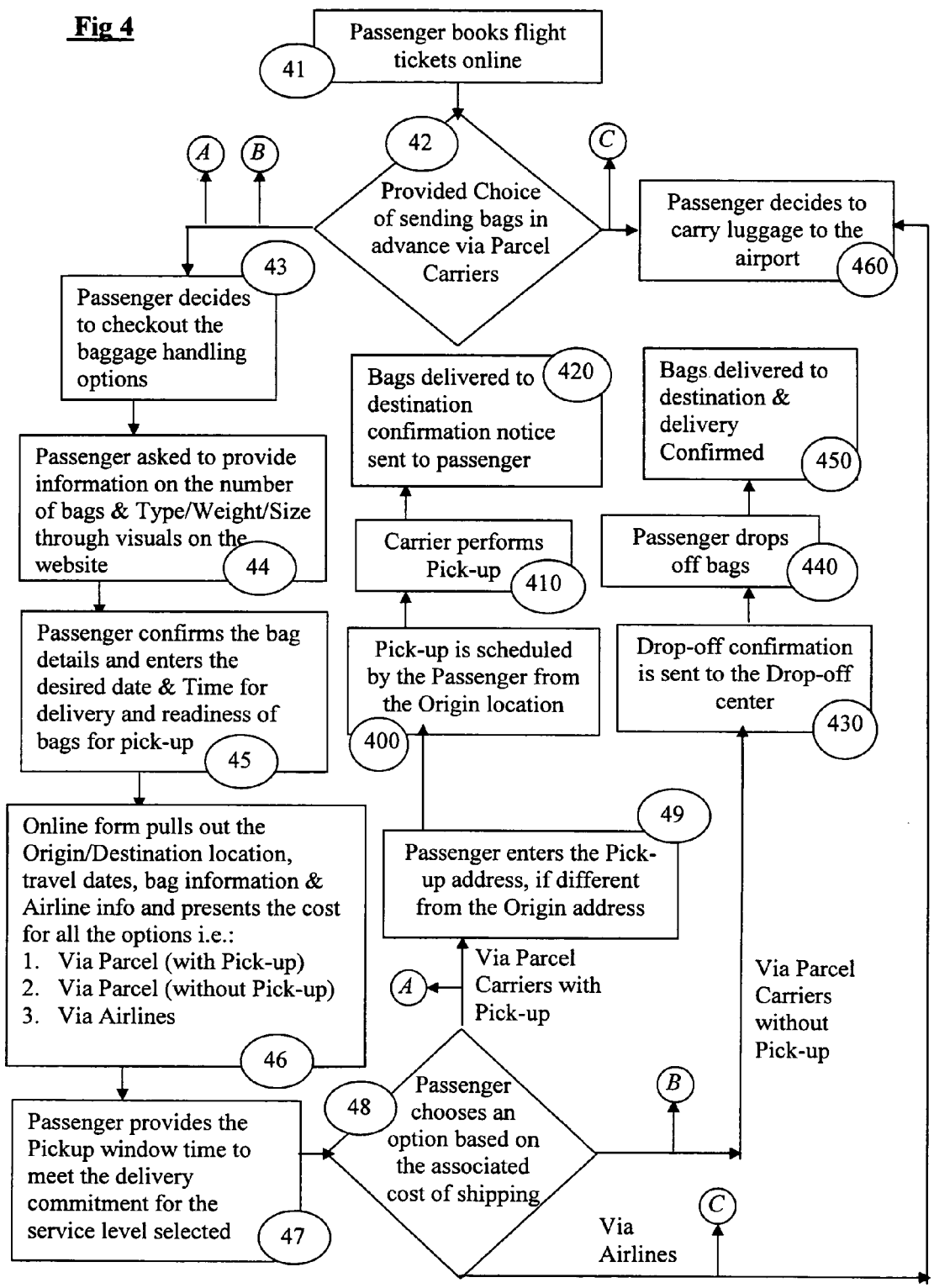

Online Flight Booking

|  |  | Departure | | | Arrival | | |
|---|---|---|---|---|---|---|---|
| Airline | Flight No. | Airport | Date | Time | Airport | Date | Time |
| USAirways | 1077 | PIT | 3/29/04 | 8:40 am | LGA | 3/29/04 | 9:50 am |

Next to enter Baggage Information

FIG. 5a

Flight Information

| | | Departure | | | Arrival | | |
|---|---|---|---|---|---|---|---|
| Airline | Flight No. | Airport | Date | Time | Airport | Date | Time |
| US Airways | 1077 | PIT | 3/29/04 | 8:40 am | LGA | 3/29/04 | 9:50 am |

Baggage Information  50

| Piece | Type | Icon | Weight (lbs.) |
|---|---|---|---|
| ☑ 1 | bag, soft | | 8 |
| ☑ 2 | briefcase, hard | | 13 |
| ☑ 3 | luggage, small | | 35 |
| ☑ 4 | luggage, large | | 68 |
| ☐ 5 | bag, soft | | |

Icon Chart (used to help select baggage type)  51

|  |  |  |  |
|---|---|---|---|
| Soft Bag | Briefcase | Small Luggage | Large Luggage |
|  |  |  |  |
| Golf Clubs | Skis | Baby Stroller | Baby Seat |
| - Other - Width x Height x Length ☐ x ☐ x ☐ | | | |

| | |
|---|---|
| Is this information correct? To continue to baggage options page: | Next |
| To correct information: | Go Back |
| Clear all baggage information: | Cancel |

FIG. 5b

Flight Information

| | | Departure | | | Arrival | | |
|---|---|---|---|---|---|---|---|
| Airline | Flight No. | Airport | Date | Time | Airport | Date | Time |
| USAirways | 1077 | PIT | 3/29/04 | 8:40 am | LGA | 3/29/04 | 9:50 am |

Baggage Information and Transportation Options 52
(check all that you would like to see a quote for)

| Piece | Type | Weight (lbs.) | Airline Carry On | Airline Check In | Parcel Carrier (with Pickup) | Parcel Carrier (Drop off Center) |
|---|---|---|---|---|---|---|
| 1 | Soft Bag | 8 | ✓ | ☐ | | |
| 2 | Briefcase | 13 | ✓ | ✓ | ✓ | ✓ |
| 3 | Small Luggage | 35 | | | ✓ | ✓ |
| 4 | Large Luggage | 68 | | | ✓ | ✓ |

(Allow traveler to include or exclude modes as desired.
By default, all options are checked.
If the Airline Check In method is chosen, Carrier options are enabled
If just Airline Carry On is chosen, Carrier options are disabled..
If Carrier options are chosen, the airline choices are disabled.)

(If any of the Parcel Carrier options are selected, then activate the form below.)

Enter starting address
or select from My Locations

Enter destination address 53
or select from My Locations

My Locations
[home address default ▼] [Other]
Address
[ ]
City, State or Zip
[ ]
Country
[United States ▼]
(pull from Home address, Office address
and other stored favorites.)

My Locations
[Destination address default ▼] [Other]
Address
[ ]
City, State or Zip
[ ]
Country
[United States ▼]
(pull from Hotel Destination and list of frequent
destinations stored in Travel Account.)

Is this information correct?
To continue to pricing options page: [Next]
To correct information: [Go Back]
Clear all baggage information: [Cancel]

FIG. 5c

Flight Information

| | | Departure | | | Arrival | | |
|---|---|---|---|---|---|---|---|
| Airline | Flight No. | Airport | Date | Time | Airport | Date | Time |
| USAirways | 1077 | PIT | 3/29/04 | 8:40 am | LGA | 3/29/04 | 9:50 am |

Baggage Transportation Pricing Matrix 54

Quotations shown for baggage travel pertaining to:

origin zip code  15106 destination zip code  64648

| Piece | Type | Weight (lbs.) | Parcel Carrier (with Pickup) Express | Parcel Carrier (with Pickup) Standard | Parcel Carrier (Drop off Center) Express | Parcel Carrier (Drop off Center) Standard | Airline Carry On | Airline Check In | |
|---|---|---|---|---|---|---|---|---|---|
| | | | Next Day by Noon | 3 Day Transit by 5pm | Next Day by Noon | 3 Day Transit by 5pm | | | |
| 1 | Soft Bag | 8 | ○ $65.94 | ○ $12.75 | ○ $61.94 | ○ $8.75 | ○ $40.00 | ⊙ $40.00 | choose one |
| 1 | Briefcase | 13 | ○ $74.12 | ○ $13.80 | ○ $70.12 | ○ $9.80 | ○ $40.00 | ⊙ $40.00 | choose one |
| 1 | Small Luggage | 35 | ○ $123.97 | ⊙ $22.90 | ○ $119.97 | ○ $18.90 | | ○ $210.00 | choose one |
| 2 | Large Luggage | 68 | ○ $196.82 | ⊙ $34.15 | ○ $192.82 | ○ $30.15 | | ○ $280.00 | choose one |
| | | | Default Pickup Address | | Default Drop Off Center | | | | |
| | | | 5020 Cherry Lane Wexford, PA 15063 | | Luggage To Go 1200 Main St Pittsburgh, PA 15219 | | | | |
| | | | [choose different address] | | [choose another location] | | | | |

(traveler is able to choose a different mode of transportation for each baggage piece.)

FIG. 5d

SYSTEM AND METHOD FOR UNBUNDLING BAGGAGE COSTS FROM AIRFARE PRICES

SPECIFIC REFERENCE

The present application hereby claims benefit of provisional application Ser. No. 60/569,403, filed May 7, 2004.

BACKGROUND

1. Field of the Invention:

The present invention relates generally to airline ticketing and pricing procedures. Particularly, the present invention comprehends a system and method for categorizing airline passengers who travel with and without baggage and unbundling the baggage costs associated with the airfare to encourage separate parcel service use.

2. Description of the Related Art

In the aftermath of 9/11 terrorist attacks that exposed the need for greater security in the air transportation industry, Congress passed the Aviation and Transportation Security Act (TSA). The Act authorized security fees of up to $10 per round trip per passenger with the fees to be used to generate funds to enhance security of air travel through better screening of all passengers and bags. To meet the security mandates, TSA has invested billions in better-trained security agents and expensive metal and bomb detecting equipment for passengers and bags at airport check points.

While air travel security has improved, it falls short of addressing a major source for the security problems and the associated cost—the bags transported by the airlines. A security fee based on passengers alone has similar shortcomings as current airline fare structure fails to recognize the difference between passengers with and without bags. The current system does not create incentive-based choices for passengers to limit the baggage they carry. Consequently, existing baggage practices add to both security risks and costs of air travel.

Existing practices do little to influence the demand for baggage screening. Instead, both TSA and airlines are focused largely on screening and transporting an unconstrained supply of baggage associated with passengers. The failure to distinguish the cost of transporting passengers with and without bags is costing the industry billions in un-recovered expenses and exacerbating security gaps in baggage transport. Furthermore, it fails to discourage travelers from bringing on flights a maximum number of bags. This, in turn, causes the aircraft weight and balance calculation to be overly-conservative in that these calculations are based on baggage average weight. In other words, the disinclination of transporting baggage is a necessity in light of both cost and safety concerns involving the weight and number of bags.

With about 1.5 billion bags transported yearly by the domestic US airlines, it is evident that the airline pricing systems are not supported by the internal cost structure and there are compelling weight and security reasons to consider baggage-handling costs into airfare pricing. Accordingly, there is need for a solution that reduces demand for baggage screening, curbs airline losses, heightens the efficiency of bagging handling, and enhances the overall travel experience.

Methods for automating baggage location determination and other handling procedures within the airport terminal are known in the art. Furthermore and more recently, very general procedures for decoupling baggage from air travel have been developed. In this manner, one class of transportation carries the luggage, while another class carries the passengers. However, although the prior art encompasses the use of separate parcel services, it does not account for price variation in a method that provides different pricing options whether or not a separate parcel service is elected. Particularly, the prior art is only geared towards separating luggage from passengers and not accounting for a price variation if different luggage options are chosen. In the present method pricing matrices display a framework of fees, and methods of fare fluctuation are provided in combination with a network based means for unbundling the baggage costs from the typical base airfare.

U.S. Pat. No. 5,793,639 to Yamazaki shows a method for coordinating baggage information with security check results. U.S. Pat. No. 5,866,888 teaches the known method of using bar code technology to identify and track travelers' luggage. U.S. Pat. No. 6,594,547 to Manabe et al. is a baggage managing system for removing already-loaded baggage from an airplane if a passenger fails to board the plane. Similarly, U.S. Pat. No. 6,711,463 to Tozuka et al. teaches managing a delivery destination of a baggage by acquiring and coordinating identification and boarding status of passengers. Publication Nos. US 2003/0061085 to Lanigan; US 2003/0100973 to Quackenbush et al.; US 2003/0120510 to Panek; US 2003/0154087 to Lewenstein and WO 03/065166 to Pandya generally teach the concept of decoupling passenger baggage so that the baggage may travel in a different way than the passenger. The passenger may make a conventional reservation, but the customer also provides special instructions on when and where to pick up the baggage and where to deliver it.

Thus, there is a need for a system and method which accounts for a price variation in the airfare when a separate parcel service is used, and which provides alternative options in terms of price even if the separate parcel service is not used, thereby providing an incentive, priced-based choice to passengers when it comes to traveling with luggage. In addition, there is a need for the standardization of shape and size of bags that passengers bring to airport (carry-on and checked-in) with Radio Frequency Identification (RFID) tags manufactured to specifications established by TSA and the airline industry.

SUMMARY OF THE INVENTION

The present system and method enables airline passengers to have the option of carrying bags to the airport but with the payment of a separate per baggage charge for transportation of the luggage by the airlines and a per baggage security fee for screening service by TSA and airport authorities. A framework of fees is then enabled for passengers to choose how to handle baggage, which allows for an overall incentive-based, economical solution for the transportation of baggage for air passengers. It encourages use of less expensive means to meet security needs and transportation of bags. Rather than having to take the baggage through the check-in points and through the security lines, passengers have a framework of choices for shipping their luggage in advance to reach their destination in time of their arrival at a lower price, or carry bags to the airport for transporting by airlines at a price additional to airfare.

Generally for the present system and method, a traveler is provided with information on the fare for passenger transport and other booking options. The passenger also gets an option to utilize a baggage handling service by specifying the number of extra bags needed for the trip. If the passenger indicates carrying extra luggage, he or she has an option of choosing either the private carriers or the airlines for handling his baggage. If the passenger chooses the airlines to handle his luggage, he arrives at the airport on the departure date and purchases additional 'bag tickets' at a charge if he does not have 'bag tickets' from an advance purchase in bulk quantity, along with the boarding pass during check-in. The 'bag tickets' would be priced to collect charges for handling of such bags by TSA for security screening and for handling of such bags by airlines for transporting on passenger aircraft.

The above is incorporated as an expansion of surcharges and incentives implemented by the travel industry and more specifically, the airline industry. The airline industry has already set precedence for surcharges and extra fees for certain non-basic and value added services, such as itinerary change fees or fees for in-flight meals. Expansion of such surcharges for all but one carry-on baggage, for example, would result in lower prices for airfares, lower cost for security and enhanced security of air travel.

Thus, in one embodiment, an online booking model incorporates a group of traveling scenarios to categorize the traveler. Based on information from the online booking system, the traveler is allowed to choose from a variety of options addressing modes of baggage handling, and an online routine determines the associated costs for the options chosen, providing travel rates that vary from a base flight price.

BRIEF DESCRIPTION OF THE DRAWINGS

FIG. 4 is a flow chart illustrating an embodiment of the present invention in the form of an online booking model.

FIGS. 5a-5d are screen shot examples of the online booking model as could be viewed on a website published on the Internet.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated method, and such further applications of the principles of the invention illustrated herein, as would normally occur to persons skilled in the art to which the invention relates.

The flow charts and/or sections thereof represent a general business method and logic or program flow that can be executed by a specialized device or computer over a network and/or implemented on computer readable media or the like tangibly embodying the program of instructions. The executions are typically performed on a computer as part of a global communications network such as the Internet. For example, a computer typically has a web browser installed within the CPU for allowing the viewing of information retrieved via a network on the display device. A network may also be construed as a local, ethernet connection or a global digital/broadband or wireless network or the like.

As used herein, "base airfare" is the standard or typical fixed price for an airline ticket a passenger pays, which, as is customary, does not vary regardless of the number of luggage pieces (subject to the maximum limit presently at two carry-on bags and two check-in bags with certain maximum weight per bag) the passenger is carrying. For example, customarily a passenger with only a carry-on is asked to pay the same as a passenger with two pieces of carry-on and two pieces of checked luggage transported on the same airplane.

Figure 1:
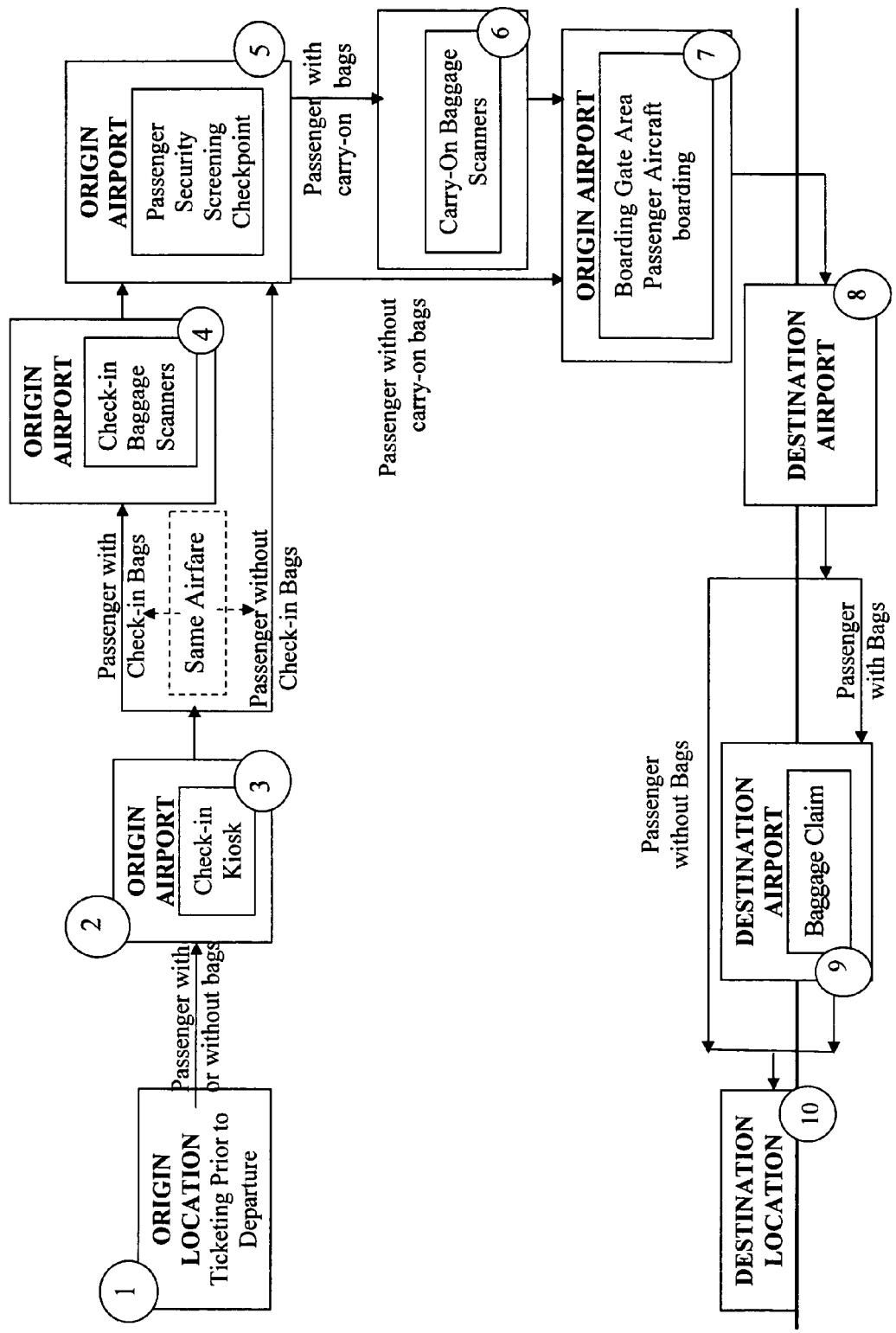
FIG. 1 is a flow chart illustrating the typical airline travel model for passengers and their checked-in and/or carry-on luggage.

FIG. 1 is a prior art illustration of the typical airline travel for the passenger and their luggage, whether their luggage is checked-in or carried-on.

A. For Passenger Without any Check-in or Carry-on Luggage

The passenger starts by booking the air travel prior to his departure from the origin location 1. At the time of departure, the passenger arrives at the origin airport 2 without any extra luggage. At the check-in kiosk 3, the passenger obtains only the boarding pass and proceeds to the passenger security-screening checkpoint 5. Passengers without any carry-on bags go through the passenger screening only and proceed to the boarding gate area 7 where they enplane the aircraft for the destination airport 8. Once at the destination airport 8, the passenger without bags heads directly for the destination location 10 without any delays.

B. For Passenger with Check-in & Carry-on Luggage

With continued reference to FIG. 1, a passenger with check-in & carry-on baggage also starts by booking the air travel prior to his departure from the origin location 1. At the time of departure, the passenger arrives at the origin airport 2 with his luggage. At the check-in kiosk 3, in addition to getting the boarding pass, the passenger with the check-in luggage also has to wait for checking in his luggage at the baggage scanners 4. After the checking-in procedure, the passenger with carry-on luggage proceeds to the passenger security screening checkpoint 5. At the checkpoint, parallel to the passenger screening, the passenger with a carry-on also has to get his luggage scanned through the baggage scanners 6. The passenger with the carry-on then proceeds to the boarding area 7 where he enplanes the aircraft for the destination airport 8. Once at the destination airport 8, the passenger with checked-in bags waits at the baggage claim area 9 for his luggage to arrive before departing for the destination location 10.

As FIG. 1 illustrates, in the current airline model, passengers with bags pay the same airfare as the passengers without bags although the passengers with bags impose an extra cost to the TSA or security company relating to baggage scanning and costs of baggage handling by the airlines.

Figure 2:
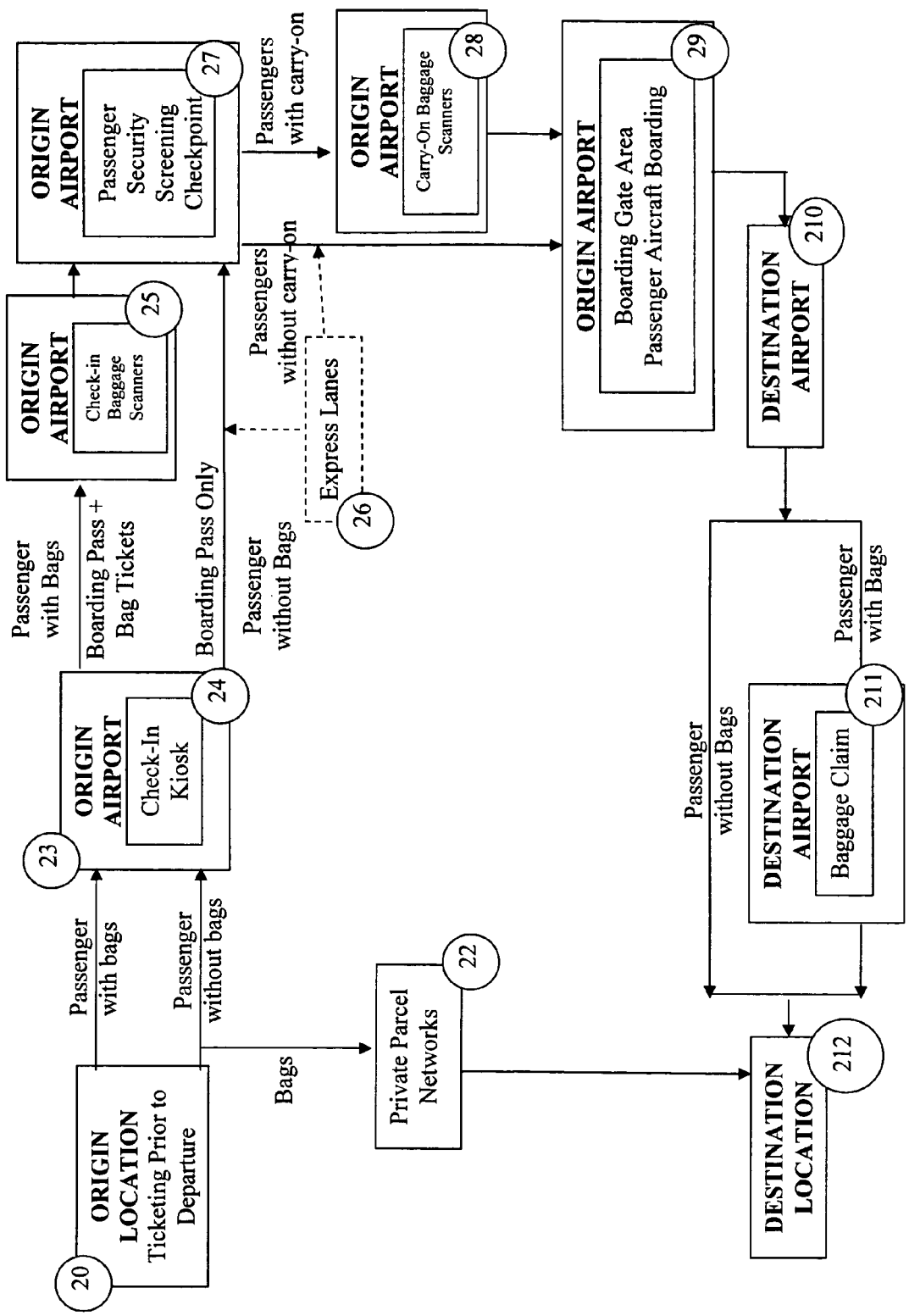
FIG. 2 is a flow chart illustrating the present model.

FIG. 2 shows generally the overall transportation scheme of the passenger/baggage under the present system and method.

A. For Passenger Without any Check-in or Carry-on Luggage

The traveler books his airline tickets from his origin location 20 prior to the date of departure. The traveler has an additional option to schedule a transfer of his luggage from the origin location to the destination location 212 using the services of the private parcel carriers. The private parcel carriers will handle such deliveries through their carrier network 22. Customarily, the passenger who decides to use the services of the parcel carriers travels without any extra check-in or carry-on baggage and so at the time of departure the passenger arrives at the origin airport 23 without any extra luggage. At the check-in kiosk 24, the passenger obtains only the boarding pass and proceeds to the passenger security-screening checkpoint 27. For the present method, it is envisioned that passengers without any carry-on luggage may optionally gain access to an express lane 26 at the passenger security checkpoint. The passengers then proceed to the boarding gate area 29 of the origin airport 23. It is further envisioned that the passengers preferably will gain priority for boarding the aircraft for the destination airport 210. Though not required, this could provide further incentive for separate parcel service use. Now, once at the destination airport 211, passengers without baggage are free to leave the airport immediately and proceed to their destination location 212.

B. For Passenger with Extra Check-in or Carry-on Luggage

Although the present invention provides for an alternate handling method for passenger's luggage, there will remain passengers who opt to carry their luggage with them during the travel and continue with the traditional system of luggage handling by the airlines. Such a passenger books his airline tickets from his origin location 20 prior to the date of departure. He forgoes the option to schedule a transfer of his luggage from the origin location 20 to the destination location 212 using the services of the private parcel carriers 22. A passenger who opts to choose this system will still have to wait in line for the check-in procedure at the check-in kiosk 24. Furthermore, it is envisioned that he also pay an extra cost to the airlines for checking in baggage, by way of "bag tickets". Passengers then have to get the checked-in baggage scanned at the baggage scanners 25. Once through the check-in procedure, the passenger proceeds to the passenger-screening checkpoint 27. It is envisioned, though not required, that the passengers with extra carry-on bags (in excess of one small carry-on) will have to pay an additional baggage scan fee, while they are passed through the carry-on baggage scanning systems 28. The passengers then proceed to the origin airport boarding gate area 29, where they preferably wait to get onto the plane after the passengers without any extra luggage have gone aboard, though possibly not required. Once at the destination airport 210, the passengers with extra luggage will have to wait for their luggage at the baggage claim area 211 before proceeding to the destination location 212.

Figure 3:
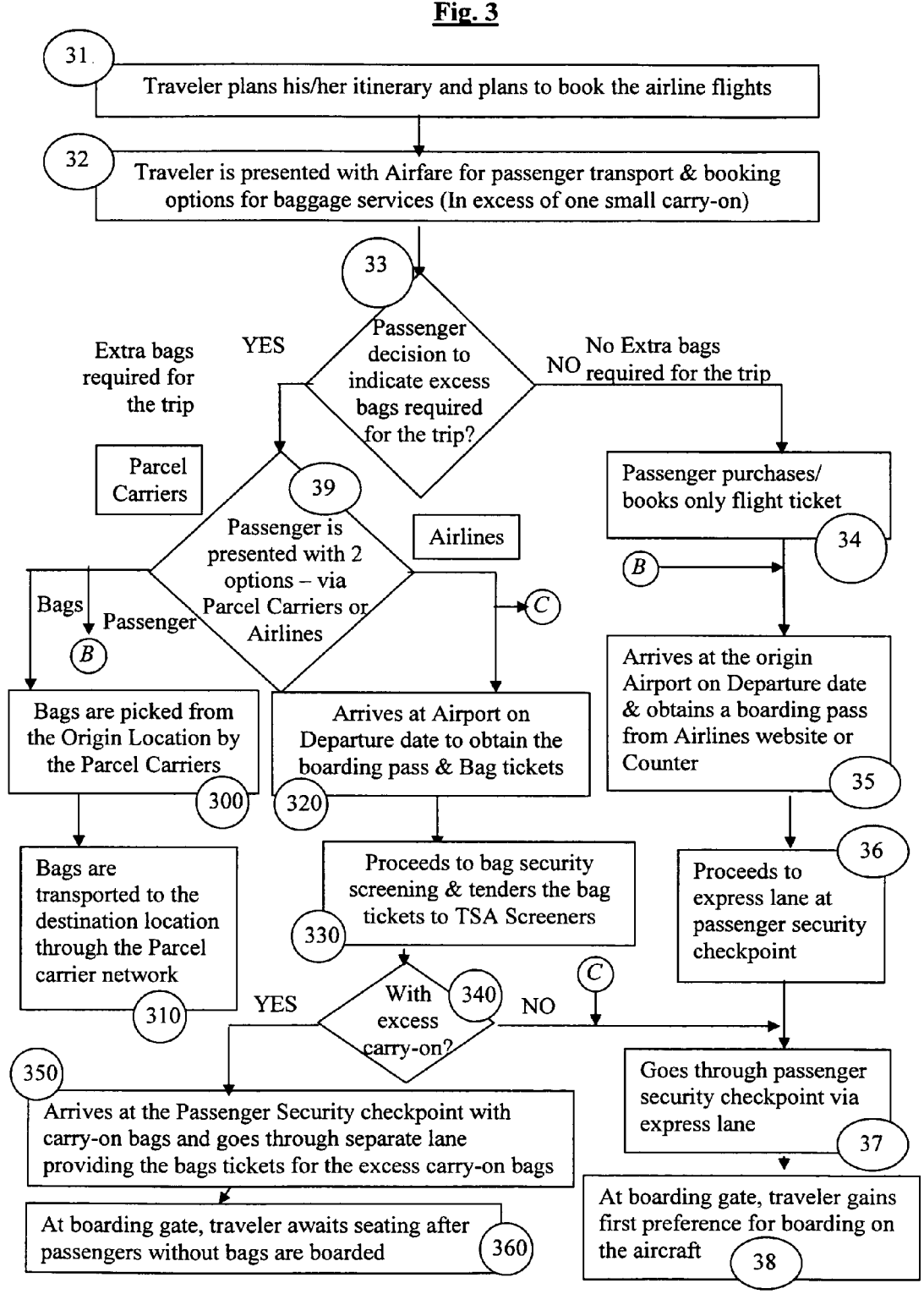
FIG. 3 is a flow chart illustrating the more detailed steps of the preferred embodiment of the present invention.

FIG. 3 depicts further the steps involved in the preferred embodiment of the proposed system. Generally, the embodiment incorporates four major scenarios under which the passenger travel and the baggage handling function, indicated below by table 1:

TABLE 1

A. Passenger with no excess baggage (No extra check-in or carry-on luggage during travel)
B. Passenger with extra luggage handled by Parcel carriers (No excess check-in/carry-on during travel)
C. Passenger with extra luggage handled by Airlines (No excess carry-on during travel)
D. Passenger with extra luggage handled by Airlines (Excess carry-on during travel)

A. Passenger with No Excess Baggage (No Extra Check-in or Carry-on Luggage During Travel)

Firstly, the traveler plans his itinerary for the trip and books his flight tickets 31. During this passenger transport & booking process, the traveler is provided with information on the fare for passenger transport & other booking options 32. The passenger also gets an option to utilize the baggage handling service by specifying the number of extra bags needed for the trip 33. If the passenger carries no excess check-in/carry-on luggage for the trip, he purchases only the flight tickets 34. On the date of departure, he arrives at the origin airport and collects his boarding pass at the time of checking-in (unless he has obtained the boarding pass via web) 35. Following the check-in procedure, the passenger without any carry-on luggage (or only one carry-on) may optionally go through an express lane at the passenger security checkpoint 37 and gets first preference for boarding the aircraft 38, though not required.

B. Passenger with Extra Luggage Handled by Parcel Carriers (No Excess Check-in/Carry-on During Travel)

Such a traveler plans his itinerary for the trip and books his flight tickets 31. During the passenger transport & booking process, the traveler is provided with information on the fare for passenger transport & other booking options 32. The passenger also gets an option to utilize the baggage handling service by specifying the number of extra bags needed for the trip 33. If the passenger indicates carrying an extra luggage 33, he has an option of using either the private carriers or the airlines for handling his baggage 39. If he chooses the private parcel carriers to handle his baggage, the bags are picked up from the origin location by the parcel carriers (passenger is provided an option to drop-off the bags at authorized shipping centers of the carrier) 300 and transported to the destination location 311 through their carrier network. The passenger who chooses the private parcel carriers and who carries no excess check-in/carry-on luggage at the time of departure, arrives at the origin airport and collects his boarding pass at the time of checking-in 35. Following the check-in procedure, the passenger without any carry-on luggage may optionally go through an express lane at the passenger security checkpoint 37 and gets first preference for boarding the aircraft 38, though not required.

C. Passenger with Extra Luggage Handled by Airlines (No Excess Carry-on During Travel)

To begin, the traveler plans his itinerary for the trip and books his flight tickets 31. During the passenger transport & booking process, the traveler is provided with information on the fare for passenger transport & other booking options 32. The passenger also gets an option to utilize the baggage handling service by specifying the number of extra bags needed for the trip 33. If the passenger chooses the airlines to handle his luggage 39, he arrives at the airport on the departure date with bag tickets from advance purchase and boarding pass from carrier's website or purchases additional 'bag tickets' at a charge, along with the boarding pass during check-in 320. Thus, 'bag ticket' charges are preferably incurred by the passenger on top of the base airfare. After checking in, the passenger proceeds to the passenger security-screening checkpoint 330. If the passenger does not have any extra carry-on luggage 340, he may go through an express lane of the passenger security checkpoint 37 and could optionally get priority while boarding the plane at the boarding area 38.

D. Passenger with Extra Luggage Handled by Airlines (Excess Carry-on During Travel)

The traveler prior to the departure plans his itinerary for the trip and books his flight tickets 31. During the passenger transport & booking process, the traveler is provided with information on the fare for passenger transport & other booking options 32. The passenger gets an option to utilize the baggage handling service by specifying the number of extra bags needed for the trip 33. If the passenger chooses the airlines to handle his luggage 39, he arrives at the airport on the departure date and purchases additional 'bag tickets' at a charge along with the boarding pass during check-in 320. Thus, 'bag ticket' charges are preferably incurred by the passenger on top of the base airfare. After checking in, the passenger proceeds to the passenger security-screening checkpoint 330. If the passenger brings an extra carry on luggage along with him 340, he goes to a lane providing the bag tickets for the excess carry-on luggage 350 and optionally pays the relevant charge. At the boarding gate, though not required, the traveler awaits seating after the passengers without any carry-on are onboard 360.

FIG. 4 demonstrates the online booking model in reference to the proposed system of baggage handling similarly discussed with reference to FIGS. 2 and 3. The online booking model incorporates the following three scenarios in table 2 below:

TABLE 2

A. Traveler chooses the baggage handling option via parcel carriers with pick-up
B. Traveler chooses the baggage handling option via parcel carriers without pick-up
C. Traveler chooses the baggage handling option via Airlines The traveler enters the online booking system, then chooses to book his trip itinerary using the suitable website 41. As a separate module to this online booking form, the traveler is given an option to choose the mode of baggage handling. He is presented with two options for transporting the baggage, via parcel carriers or via airlines 42. If the passenger chooses to checkout the baggage handling option 43, he is required to provide the bag information, for example the number of bags, type, weight and size, through visuals on the online form 44. The passenger then confirms the baggage information and provides the desired date and time for pick-up and delivery 45. Based on the information on the booking, origin/destination, travel dates and airline information, an online routine determines the costs for the option of transporting baggage via parcel carriers and via airlines 46. As part of the routine, the information is processed to be compatible with data required to get real-time pricing quotes of the parcel carriers providing the service. A conversion is done using pre-existing tables in the booking model and from information gathered real-time from the carrier services. The retrieved pricing information is then displayed back on the pricing matrix (described below). Thus, any conversions done based on the options chosen are generated real-time using a combination of real-time parcel carrier information and from pre-existing tables/calculations. The passenger is also provided with the pick-up window time to meet the delivery commitment for the service level selected 47. Next, the passenger chooses one of the options based on the associated cost of shipping 48.

A. Traveler Chooses the Baggage Handling Option via Parcel Carrier with Pick-up

If the passenger chooses a parcel carrier to handle his baggage and also opts for a pick-up, he enters the pick-up location, if different from the origin location 49. A pick-up is scheduled 400 based on the passenger's information. Consequently, the baggage is picked-up on the scheduled date 410 and delivered to the destination location, and a confirmation is sent to the passenger 420.

B. Traveler Chooses the Baggage Handling Option via Parcel Carrier Without Pick-up If the passenger chooses a parcel carrier to handle his baggage and opts for a drop-off option, the schedule for the drop-off based on the travel itinerary is sent to the drop-off center 430. After the passenger drops off the bags 440, the parcel carrier delivers the bags to the destination and confirms the delivery to the passenger 450.

C. Traveler Chooses the Baggage Handling Option via Airlines

If the passenger does not opt for the parcel carriers and prefers the airlines handle the bags, he is charged online for only the passenger ticket, differing from the base airfare, and at the time of departure he carries his baggage to the airport 460 where he or she will later tender the required number of bag tickets purchased in advance or pay for 'bag tickets' at the time of check-in as described above.

FIG. 5 demonstrates the online booking model. Concurrent with or subsequent to booking the flight, the passenger links to a baggage information page 50. The passenger then may enter baggage information regarding his luggage, including bag type, and estimated weight and size. An icon chart 51, or other similar table, listing, or interactive graphic may be used to help categorize standard types of baggage. The standard bags could be developed to have certain size and weight relationships that are certified for use on airlines by the TSA and the airline industry, such that non-standard bags would get priced differently. In addition, these TSA and airline industry approved bags (carry-on and check-in) would have RFID tags to facilitate linkage of bags with passengers, balancing of weight on aircraft, matching of checked-in bags with boarded passengers and for collection of important data on cost imposed by passengers for baggage handling by airports, TSA and airlines. In this manner, for example, the user/passenger could simply click on the appropriate graphic or link. The passenger may alternatively enter the dimensions of other types of non-standard luggage not included in the icon chart 51. The passenger then confirms the accuracy of all inputs or may correct or clear any information entered. After confirmation of the baggage information, the baggage information and transportation options window 52 is displayed, which allows for the appropriate price quotes to be generated by the routine for at least one of the transportation options chosen. If any of the parcel carrier options are selected, the passenger is directed to an address screen 53 so that the passenger can input the starting and destination address. This information is then confirmed, or may be corrected or cleared as necessary.

Next, the baggage transportation pricing matrix 54 is displayed as output to the checked baggage and transportation options. The prices for the options chosen are displayed after being generated, and the passenger is allowed to choose different modes of transportation for each baggage piece at that particular price displayed. The prices may vary accordingly depending on airport check-in and type of parcel service used, and thus a total transportation cost may vary when coupled to the airfare, but in this manner, baggage transportation and cost have been parceled out of a base air fare price, ultimately allowing a traveler many options to choose from as it pertains to their luggage.

I claim:

1. A method using a computer and a network for unbundling baggage costs for airline transportation to which is linked real-time parcel carrier pricing data and airline pricing data, said method comprising the following steps executed by said computer:

maintaining an option A for said traveler, wherein said option A is for said traveler booking solely airline tickets without any accompanying check-in luggage or without more than one carry-on luggage;

disabling baggage service options and charging said traveler solely for a flight ticket provided said traveler elects said option A;

presenting to said traveler in conjunction with said option A, a baggage services option, said baggage services option including:

an option B for said traveler, wherein said option B is for said traveler scheduling a transfer of all luggage from an origin location to a destination location using services of a separate carrier;

an option C for said traveler, wherein said option C is for said traveler using an airline to handle and transport said check-in luggage from said origin location to said destination location;

an option D for said traveler, wherein said option D is for said traveler handling more than one carry-on luggage themselves and using said airline to handle and transport said check-in luggage;

linking said traveler to and displaying a baggage information page to said traveler if said baggage services option is selected as a result of either said option B, said option C, or said option D being elected by said traveler, wherein said traveler enters baggage information regarding said luggage;

displaying a baggage information and transportation options window as output to said baggage information page incorporating said options B, C, and D wherein multiple modes of travel for said luggage can be checked or unchecked as a selection by said traveler and, by default, selecting all modes of travel;

receiving as input from said traveler said selection of one or more of said multiple modes of travel;

enabling carrier options and displaying said carrier options using a baggage transportation pricing matrix as output to said traveler selecting said one or more of said multiple modes of travel;

charging said traveler for said flight ticket and said separate carriers provided said traveler chooses said option B;

charging said traveler for said flight ticket and additionally for a bag ticket charge provided said traveler chooses said option C;

charging said traveler for said flight ticket and additionally for said bag ticket charge and additionally for a baggage scan fee provided said traveler chooses said option D, and, as a result, electronically generating and displaying a price-based and incentive-based quote for said traveler even if said separate carrier is not used.

2. The method of claim 1, wherein said quotes displayed are multiple and vary further for said option B according to whether said traveler is going to drop off said luggage at a carrier drop off center or ask that said carrier pickup said luggage at a pickup address of said traveler.

3. The method of claim 1, wherein said quotes vary for said option B or said option C according to a size, a weight, and a type of said luggage.

4. The method of claim 3, wherein an icon chart is displayed to said traveler to help said traveler select said type of said luggage, further comprising the step of displaying a graphic representing a standard bag.

5. The method of claim 4, wherein said icon chart allows said traveler, optionally, to manually input approximate dimensions of said luggage if said luggage is not represented by said graphic because said luggage is a non-standard bag.

6. The method of claim 5, wherein said non-standard bag is priced differently from said standard bag.

7. The method of claim 1, further comprising providing incentives to said traveler to urge said traveler to choose said option B.

8. The method of claim 7, wherein an express lane is provided to said traveler.

9. The method of claim 7, wherein said traveler is provided with priority status for boarding said airline.

10. A computer-readable medium embodying computer executable instructions for unbundling baggage costs for airline transportation causing a computer to execute the following steps:

maintaining an option A for said traveler, wherein said option A is for said traveler booking solely airline tickets without any accompanying check-in luggage or without more than one carry-on luggage;

disabling baggage service options and charging said traveler solely for a flight ticket provide said traveler elects said option A;

presenting to said traveler in conjunction with said option A, baggage service options, said baggage service options including:

an option B for said traveler, wherein said option B is for said traveler scheduling a transfer of all luggage from an origin location to a destination location using services of a separate carrier;

an option C for said traveler, wherein said option C is for said traveler using an airline to handle and transport said check-in luggage from said origin location to said destination location;

an option D for said traveler, wherein said option D is for said traveler handling more than one carry-on luggage themselves and using said airline to handle and transport said check-in luggage;

linking said traveler to and displaying a baggage information page to said traveler if either said option B, said option C, or said option D is elected by said traveler, wherein said traveler enters baggage information regarding said luggage;

displaying a baggage information and transportation options window as output to said baggage information page incorporating said options B, C, and D wherein multiple modes of travel for said luggage can be checked or unchecked as a selection by said traveler and, by default, selecting all modes of travel;

receiving as input from said traveler said selection of one or more of said multiple modes of travel;

enabling carrier options and displaying said carrier options using a baggage transportation pricing matrix as output to said traveler selecting said one or more of said multiple modes of travel;

charging said traveler for said flight ticket and said separate carriers provided said traveler chooses said option B;

charging said traveler for said flight ticket and additionally for a bag ticket charge provided said traveler chooses said option C;

charging said traveler for said flight ticket and additionally for said bag ticket charge and additionally for a baggage scan fee provided said traveler chooses said option D, and, as a result, electronically generating and displaying a price-based and incentive-based quote for said traveler even if said separate carrier is not used.

11. The medium of claim 10, wherein said quotes displayed are multiple and vary further for said option B according to whether said traveler is going to drop off said luggage at a carrier drop off center or ask that said carrier pickup said luggage at a pickup address of said traveler.

12. The medium of claim 10, wherein said quotes vary for said option B or said option C according to a size, a weight, and a type of said luggage.

13. The medium of claim 12, wherein an icon chart is displayed to said traveler to help said traveler select said type of said luggage, further comprising the step of displaying a graphic representing a standard bag.

14. The medium of claim 13, wherein said icon chart allows said traveler, optionally, to manually input approximate dimensions of said luggage if said luggage is not represented by said graphic because said luggage is a non-standard bag.

15. The medium of claim 14, wherein said non-standard bag is priced differently from said standard bag.

* * * * *